May 10, 1960 R. H. MORRIS 2,935,797
APPARATUS FOR DISPLAYING THE PROPERTIES OF LIGHT
Filed April 12, 1957 5 Sheets-Sheet 1

INVENTOR
RICHARD H. MORRIS

By
Watson, Cole, Grindle & Watson
ATTORNEYS

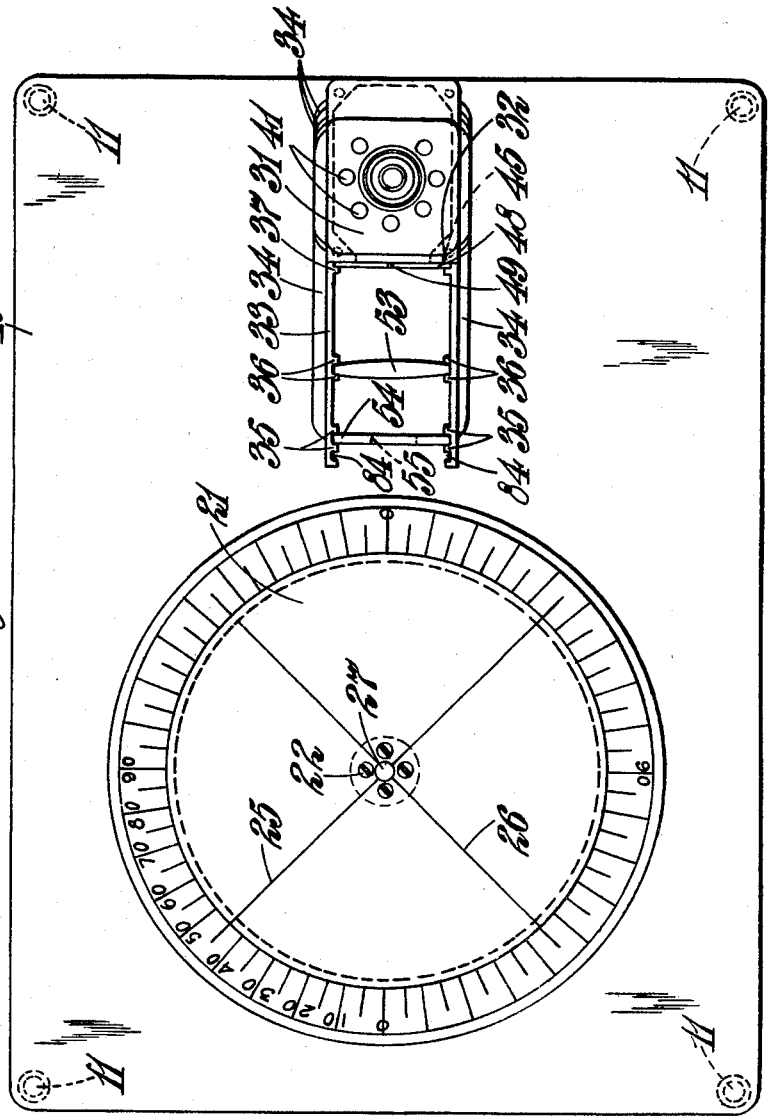

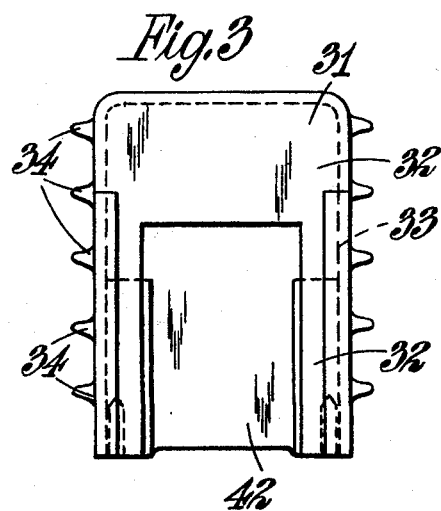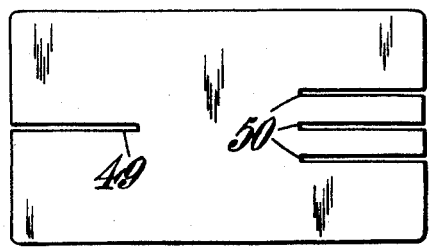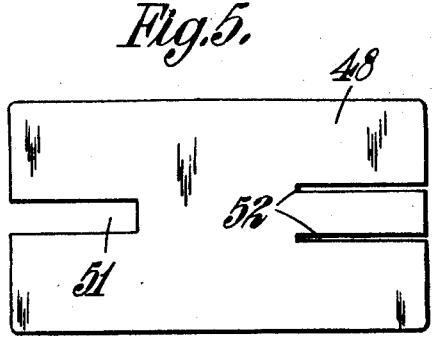

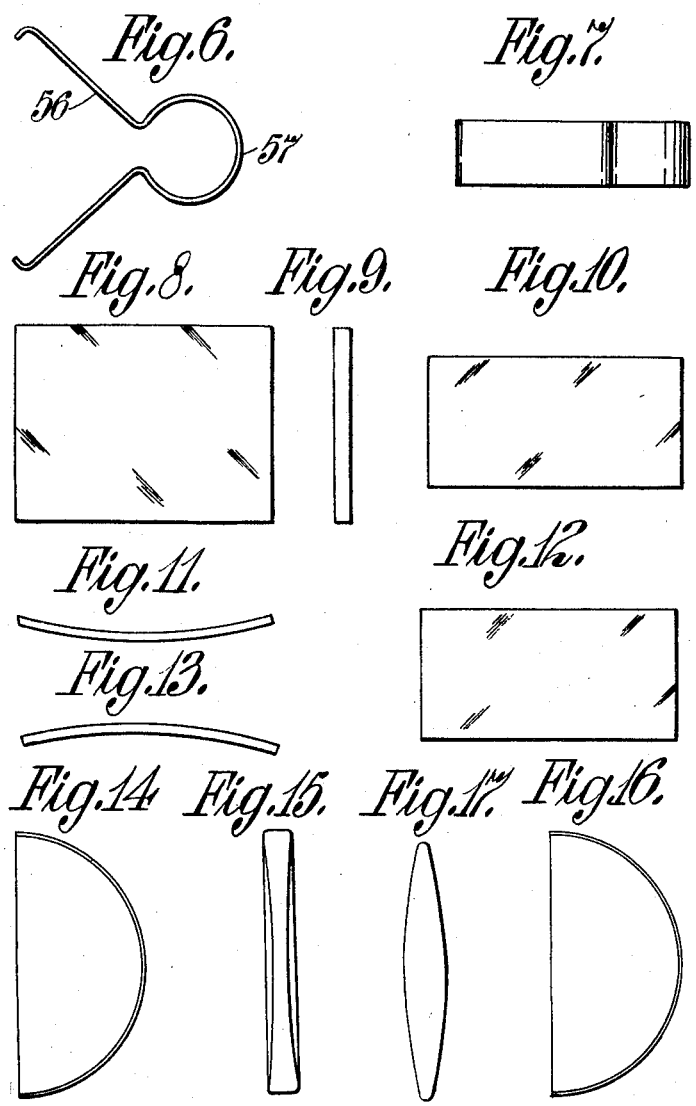

May 10, 1960 R. H. MORRIS 2,935,797
APPARATUS FOR DISPLAYING THE PROPERTIES OF LIGHT
Filed April 12, 1957 5 Sheets-Sheet 5
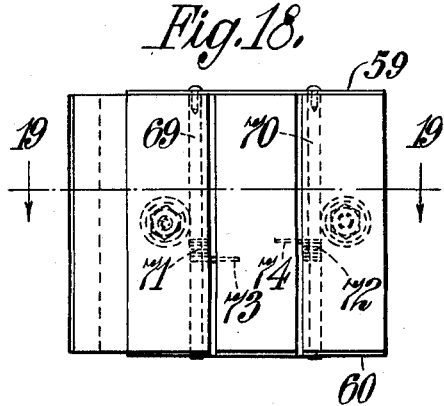
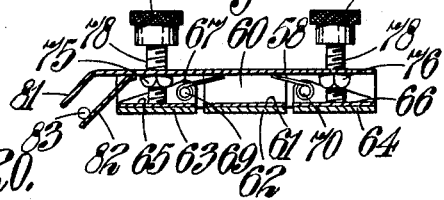
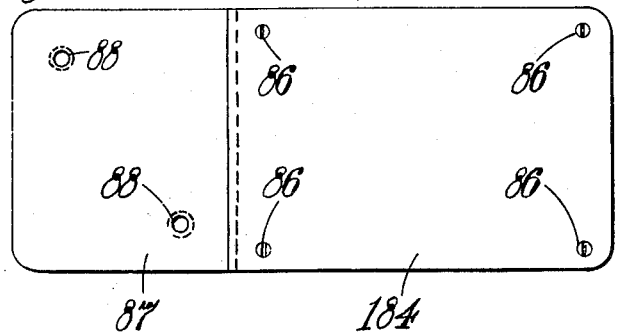
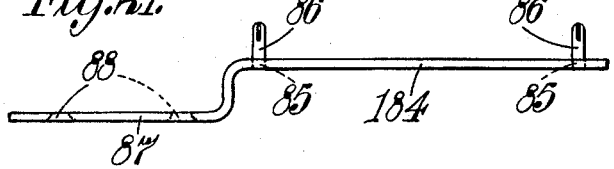
INVENTOR
RICHARD H. MORRIS
By Watson, Cole, Grindle & Watson
ATTORNEYS

United States Patent Office 2,935,797
Patented May 10, 1960

2,935,797

APPARATUS FOR DISPLAYING THE PROPERTIES OF LIGHT

Richard Henry Morris, Folkestone, England, assignor to Griffin & George Limited, Wembley, England, a British company Application April 12, 1957, Serial No. 652,386

Claims priority, application Great Britain April 12, 1956

19 Claims. (Cl. 35—19)

This invention relates to apparatus for displaying the properties of light, particularly for educational purposes and has for an object to provide a simple, inexpensive and compact arrangement which can be readily manipulated by a student.

According to this invention an apparatus for displaying the properties of light comprises a light box having means for supporting a light source therein which box has an opening at one side and wing portions extending from said opening and arranged for detachably mounting between them elements which modify the light rays from said source.

The light box may also be open on a side which is to be arranged opposite a supporting surface which latter thus forms a closure.

An important feature of this invention consists in that said wing portions are formed integrally with the light box so as to form a self contained unit. For example, the apparatus may be moulded either from metal or plastics.

The aforesaid means for detachably mounting said elements may comprise a number of guideways extending transversely to the longitudinal edges of the wing portions on the inner faces of the wings and spaced apart along the length thereof. For example the guides may comprise a number of pairs of ribs cast on the inner faces of the wing portions.

One pair of said ribs on each wing may be arranged closely adjacent the light box and another pair may be arranged on each wing at the extremities remote from the light box for the purpose hereinafter described.

The aforesaid integral casting may be provided with radiating fins which extend in a direction along the length of the wing portions. Said fins may be arranged to extend along both the sides of the box and the wing portions. The ribs are preferably provided with comparatively sharp edges which enable the unit to be readily lifted without excessive heat being transmitted to the fingers.

The aforesaid means for supporting the light source is preferably arranged to permit its adjustment in the direction of the length of the wing portions.

The light source may comprise an electric light bulb held in a conventional lamp holder having a clamping ring and a hole may be formed in a wall of the light box through which the holder extends and is of such a size as to permit adjustment of the holder in the aforesaid direction and the clamping ring may be arranged to secure the lampholder in the adjusted position.

In the case where the apparatus is used for demonstrating behaviour of one or more groups of light rays, one of the aforesaid elements may comprise a shutter having one or more slots therein which shutter is arranged in the guideways close to the light box and another of said elements comprises a cylindrical lens having its edges arranged in another set of guideways at a distance from the light source corresponding to the focal length of the lens and with the axis of the cylinder substantially parallel to said slot or slots. By these means a number of light beams each in the form of a thin sheet, are produced which in striking a screen forms straight illuminated lines.

In the case where a shutter is employed with slits, the electric light bulb may be selected with a straight filament which may be disposed parallel with said slits.

There may be employed with the apparatus a kit of separate elements usually provided for light experiments such as concave and convex mirrors, convex and concave lenses and various shaped prisms and which may be placed in the path of the light beams provided by the apparatus. It will be appreciated that by arranging the shutter close to the light box any extraneous light is avoided.

As previously indicated the light box is open on a side which is arranged opposite a supporting surface which may be the surface of a bench or table or a supporting board. The edges of the box around this open side may have cast or otherwise formed in them holes or sockets which are engageable with projections on said supporting surface which may thus be disposed in a plane other than a horizontal plane without fear of the light box becoming dislodged. Recesses may be provided in the edges of the light box around the latter opening so as to permit the ingress of cooling air when the apparatus is resting on a supporting surface.

The following is a description of one form of display apparatus according to the invention particularly suitable for educational purposes reference being made to the accompanying drawings in which:

Figure 2 is a plan view of the arrangement shown in Figure 1,

Figure 3 is a view of the light box looking from the left of Figure 1,

Figure 1:
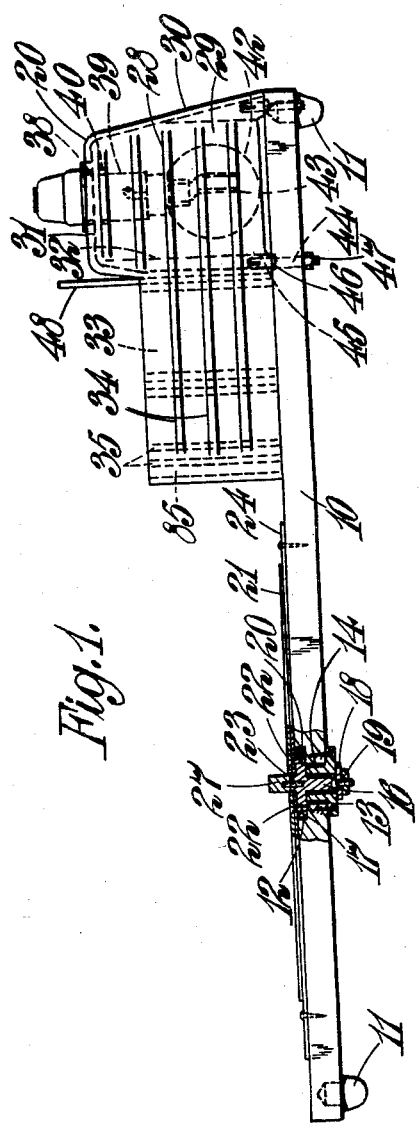
Figure 1 is a side elevation of the assembled apparatus.

Figures 4 and 5 are two alternative forms of slotted screens for use with the light box, Figure 6 is a plan view of a spring clip for holding various shapes of mirrors, Figure 7 is a side elevation of the clip shown in Figure 6, Figure 8 is a face view of one form of mirror suitable for use with the aforesaid clip, Figure 9 is an edge-on view of that mirror looking from the right of Figure 8, Figures 10 and 11 are views corresponding to Figures 8 and 9 of a concave mirror, Figures 12 and 13 are similar views to Figures 8 and 9 showing a convex mirror, Figure 14 is a face view of a half circular bi-concave lens, suitable for use with the apparatus, Figure 15 is a view looking from the left of Figure 14, Figure 16 is a face view of a half circular bi-convex lens, Figure 17 is a view looking from the left of Figure 16, Figure 18 is a face view of a three part adjustable multi-coloured mirror, Figure 19 is a section on the line 19—19 of Figure 18, Figure 20 is a plan view of a bracket for supporting the light box on a support other than the support shown in Figure 1, and Figure 21 is an edge-on view of the bracket looking downwardly on Figure 20.

Referring to the arrangement shown in Figures 1 and 2 a rectangular base board 10 is provided with four feet 11 which may be formed of rubber and provided with reduced portions which are a push fit in holes formed in the underside of the board. The board is provided with a stepped hole 12, 13 the larger diameter portion being uppermost, a flanged bush 14 extends into the smaller part of the hole and the flange is secured to the under side of the board by a number of wood screws 15. A spindle 16 extends through said bush, and its upper end is formed with an enlarged head 17 which is countersunk in the larger diameter part 12 of the stepped hole in the board. The lower end of the spindle is reduced in diameter and is screw threaded. The distance between the shoulder provided by the reduced end and the underside of the head is slightly greater than the overall axial length of the aforesaid flanged bush. The reduced end receives a washer 18 and a nut 19. The aforesaid head is provided with a number of tapped holes 20. A disc 21 is provided with holes registering with the holes 20 and through which screws 22 extend and engage the threaded holes whereby the disc is secured firmly to the head. The head may be provided with a shallow projection which engages a hole in the disc thereby locating it concentrically with the spindle. Secured concentrically with the disc on the board is a scale 24 after the manner shown in Figure 2. The upper face of the board and of the disc are matt white and the disc is marked with two diametrically extending lines 25, 26 arranged at right angles to one another. The shallow projection 23 may be drilled and tapped to receive a threaded stem which may be engaged by a knurled manipulating knob 27. The disc 21 thus constitutes a turn-table which may support various auxiliaries such as mirrors, prisms, screens, etc.

Detachably mounted on the board 10 at one end thereof is a light box 28. The light box is so formed that it may be moulded from metal or plastics and is provided with side walls 29, a sloping back wall 30, a top wall 31 and an apertured front wall 32 and it is open at the bottom. The side walls 29 are provided with wing like extensions 33. The side walls of the light box and their extensions are provided with a number of horizontally disposed heat radiating ribs 34 which have comparatively sharp edges so that they may be gripped without transmitting too much heat. Each wing portion 33 is provided with two pairs of ribs 35 and 36 forming guideways for holding various parts of the optical equipment. A further rib 37 is spaced a short distance forwardly of the front wall 32 to provide yet a further guideway. The upper wall 31 of the light box is provided with an oval shaped hole 38 having its major axis extending in the direction of the length of the wings and through which may extend a body 39 of a lamp holder. The lamp holder may be adjusted along the length of the oval hole and held in position by a conventional clamping ring 40. The top wall 31 around the oval hole is formed with a number of ventilating holes 41. The lower edges of the side walls 29 are recessed at 42 so as to permit ventilating air to enter the box. The lamp holder accommodates an electric bulb 42 having a straight vertical filament 43. The bottom edge of the light box has drilled in it four holes each disposed near the junctions between two of the walls of the light box front. These holes are engaged by four locating pegs 44 which extend through holes in the board. The upper ends of the pegs project from the top face of the board and are slit at 45 so that the resulting prongs may grip the holes in the light box. The upper ends are also provided with flanges 46 which may be countersunk in recesses in the board. The lower extremities of the pegs project below the bottom of the board and are screw-threaded to receive clamping nuts 47. By these means the light box is so located that the axis of rotation of the turntable lies in a vertical plane disposed midway between the wings.

The guideway formed by the rib 37 and the front wall 32 may accommodate alternative forms of shutters 48 certain of which are shown in Figures 4 and 5. The shutters may be formed from sheet aluminum. The shutter shown in Figure 4 is provided at one end with a single slot 49 extending from the centre of one of its edges and three equally spaced slots symmetrically disposed on the plate and extending from the other end. The length of the shutter is such that it may be slid into position either with the three slots opposite the lamp or the single slot. The shutter shown in Figure 5 is provided with a wider centrally disposed slot 51 at one end and two narrower slots 52 at the other end. As will be seen from Figure 2 the pairs of ribs 36 may accommodate a convex cylindrical lens 53 arranged with its axis upright and the pairs of ribs 35 may accommodate a stop plate 54 having a central aperture 55. The effect of the single slot 49 shown in the shutter 48 and of the cylindrical lens arranged at a distance from the light source proportional to the focal length of the lens is to produce a narrow vertical beam of light which will appear as an illuminated line on the white upper face of the board 10 and on the disc 21. If a mirror is located on the disc when the disc is in a position shown in Figure 2 and is disposed along the diametrical line 25 the beam of light will appear on the disc and will intersect the 90° marking on the scale. Various forms of mirrors such as are shown in Figures 8 and 13 may be held and supported on a surface by a spring clip 56 as shown in Figure 6, the clip may be provided with a cylindrical portion 57 the extremities of the clip are arranged to grip the side edges of any of the mirrors so that one edge of the clip is in line with another edge of the mirror and thus provides an adequate supporting area.

The mirror shown in Figures 8 and 9 is a simple flat mirror, that shown in Figures 10 and 11 is a concave mirror and that shown in Figures 12 and 13 is a convex mirror. Each of the mirrors is of rectangular configuration having approximately the same length so that any one of them may be gripped by the same clip.

The lens shown in Figures 14 and 15 is a half-circular bi-concave lens, and that shown in Figures 16 and 17 is a half-circular bi-convex lens. Each of the lenses may be stood with its flat diametrical portion on the board upon the flat edge or it may be stood on the turn-table, opposite the light box.

A multi-part adjustable mirror is shown in Figures 18 and 19 and comprises a backing plate provided top and bottom with flanges 59, 60 projecting at right angles thereto. Secured between the two flanges at a central location is a backing strip 61 to which is secured a strip of mirror 62. Two other strips 63, 64 of the mirror are respectively secured to backing strips 65, 66 which are provided at the top and bottom thereof with triangular flanges 67 and 68. The flanges at their wider portions, are drilled to receive hinge pins 69, 70 which also, engage holes in the flanges 59, 60. The hinge pins 69, 70 are encircled by helical springs 71, 72 having tags 73, 74 at their ends which engage the inner face of the back plate 58. The other tags, not shown, engage the backing plates 65, 66, in such a manner as to tend to move those edges of the mirror strips which are remote from the hinge pins towards the backing plate. The backing plate has attached to it nuts 75, 76 which are engaged by threaded stems 77, 78 which at their outer ends are provided with manipulating knobs 79, 80 whereas the inner ends of the stems engage the backing plates 65, 66 whereby the angular position of the mirror strips 63, 64 can be adjusted by rotation of the knobs.

One edge of the backing plate is bifurcated at 81, 82, the bifurcated portions are arranged at 45° to the main part of the backing plate. The bifurcated portion 82 has a thin rod 83 extending along it near one edge. This bifurcated portion is arranged to engage either of two upright ribs 84 disposed to the end of the wing portion 33 of the light box and which ribs are disposed close to the aforesaid ribs 35, the wire 83 lying in the groove formed between one of the ribs 84 and 35. With this arrangement a shutter such as is shown in Figure 4 may be disposed in a guideway provided by the ribs 37 and the front wall of the box so that the three slots are opposite the light source and there may be disposed between the pairs of ribs 36 a multi coloured screen having three vertical transparent strips, say, red, green, and blue. The three light beams provided by the three slots pass respectively through the three coloured screens and are received by the three strip like mirrors. By adjusting the angular disposition of the mirrors there may be demonstrated the phenomena of light reflection and the manner in which the combination of the three coloured beams form a white light.

In case the light box requires to be located farther away from the turntable there is provided a bracket plate 184 as shown in Figures 20 and 21. The plate is cranked so as to provide a part 87 which underlies the board 10 and is secured thereto by screws which pass through holes 86. The other part 88 of the bracket plate extends cantilever fashion from the end of the board 10 and is provided with four threaded holes 85 spaced apart in a similar manner to the holes in the bottom edge of the light box and each of these threaded holes receives the threaded end of a peg 86 which at the other end is slit to provide prongs which resiliently engage one of the holes in the light box.

I claim:

1. An apparatus for displaying properties of light comprising, a light box, a light source within the box, wing portions fixed directly to and extending forwardly of the light box, said wing portions being spaced apart so as to provide a clear throughway therebetween of the full height of said wing portions, said light box having a front wall spanning the space between said wing portions, said wall being provided with an opening in front of the light source, guideways on the inner faces of the wings which locate between them optical elements positively against movement towards and away from said light source.

2. An apparatus according to claim 1 wherein the wing portions are moulded integrally with the light box so as to form a self contained unit.

3. An apparatus according to claim 1 wherein said means for detachably mounting said elements may comprise a number of guideways extending transversely to the longitudinal edges of the wing portions on the inner faces thereof and spaced apart along the length thereof.

4. An apparatus according to claim 1 wherein said means for detachably mounting said elements comprise a number of pairs of ribs cast on the inner faces of the wing portions.

5. An apparatus according to claim 1 wherein said means for detachably mounting said elements comprises a number of pairs of ribs cast on the inner faces of said elements, certain of which pairs are arranged adjacent the light box, and other of which pairs are arranged at the extremities of the wings remote from the light box for the purpose described.

6. An apparatus according to claim 1 wherein heat radiating fins are arranged on the light box to extend in a direction along the length of the wing portions.

7. An apparatus according to claim 1 wherein heat radiating fins having comparatively sharp edges are arranged on the light box to extend in a direction along the wing portion.

8. An apparatus according to claim 1 wherein means are provided for adjusting the position of the light source in said box in the direction of the length of the wing portions.

9. An apparatus according to claim 1 wherein said light source comprises an electric light bulb held in a conventional lamp holder having a clamping ring and wherein a hole is formed in the top wall of the light box through which the holder extends and is of such a size to permit adjustment of the holder in the direction of the length of the wing portions and is held in position by the clamping ring.

10. An apparatus according to claim 1 wherein one of the aforesaid elements may comprise a shutter having at least one slot therein which shutter is arranged in the guideway close to the light box and another of said elements comprises a cylindrical lens having its edges arranged in another set of guideways at a distance from the light source proportional to the focal length of the lens and arranged with the axis of the cylinder substantially parallel to said slot or slots.

11. An apparatus according to claim 1 wherein one of the aforesaid elements may comprise a shutter having one or more slots therein, which shutter is arranged in a guideway close to the light box and another of said elements comprises a cylindrical lens having its edges arranged in another set of guideways at a distance from the light source proportional to the focal length of the lens and arranged with the axis of the cylinder substantially parallel to said slot or slots and wherein the electric light bulb is provided with a straight filament which may be disposed parallel to a slot.

12. An apparatus according to claim 1 having associated therewith a kit of separate elements usually provided for light experiments such as concave and convex mirrors, convex and concave lenses and various shaped prisms.

13. An apparatus according to claim 1 wherein the edges of the box around the open bottom have formed therein holes or sockets which are engageable with projections formed on a support with which the apparatus is used.

14. An apparatus according to claim 1 wherein the edges of the light box around the open bottom are recessed for the purpose described.

15. An apparatus according to claim 1 wherein one of the aforesaid elements for use with the apparatus comprises a coloured screen having a number of transparent strips of different colours disposed apart at distances corresponding to the spacing apart of a corresponding number of slots whereby separate beams of light of different colour are formed.

16. An apparatus according to claim 1 wherein one of said elements for use with the apparatus having means for producing a number of separate beams comprises a frame in which are mounted strips of mirrors adjustable to swing about axes parallel to the planes of the light beams.

17. An apparatus according to claim 1 wherein means are provided for producing three separate beams and wherein one of said elements comprises a frame in which three strips of mirror are pivotally mounted side by side so as to swing about axes parallel to the planes of said beams.

18. An apparatus according to claim 1 wherein means are provided for producing three separate beams and wherein one of said elements comprises a frame in which three strips of mirror are pivotally mounted side by side so as to swing about axes parallel to the planes of the beams and wherein adjustment of the mirrors is provided by screws mounted in sockets secured in the frame and which screws bear against the mirrors at distances away from their pivot axes whereby the mirrors may be swung in one direction and spring means for swinging the mirrors in a reverse direction.

19. An apparatus according to claim 1 wherein one said element for use with the apparatus having means for producing a number of separate beams comprises a frame in which are mounted strips of mirrors adjustable to swing about axes parallel to the planes of the light beams and wherein one edge of said frame is provided with a socket so shaped as to engage a rib at the extremity at one of the aforesaid wings.

References Cited in the file of this patent

UNITED STATES PATENTS 2,155,114    Black _____ Apr. 18, 1939

OTHER REFERENCES

Harcourt Improved Students' Optical Disc No. 73–101, page 124 of L. E. Knott Apparatus Co., Cambridge, Mass., Catalog No. 33R of 1928.